United States Patent Office 3,499,774
Patented Mar. 10, 1970

3,499,774
MERCURY-CONTAINING PHOSPHATE GLASS
Woldemar A. Weyl, University Park, Pa., assignor to Glass Container Industry Research Corporation, New Castle, Pa., a corporation of Ohio
No Drawing. Filed Mar. 28, 1966, Ser. No. 537,680
Int. Cl. C03c 3/12
U.S. Cl. 106—47    12 Claims

ABSTRACT OF THE DISCLOSURE

Mercury-containing phosphate glass comprising 5–80% mercury (as HgO), 75–15% phosphorous (as $P_2O_5$) and at least 5% of a metal of Groups I–II of the Periodic Table, lead or aluminum. The glass may be heated to volatilize mercury and provide products of differing properties.

---

This invention relates to mercury-containing stable glass compositions and their uses.

It has not been considered possible heretofore to include mercury in glass compositions in greater than trace amounts due to the thermal instability of mercury salts and the consequent volatilization of mercury at the temperatures at which glasses are formed. Zschacke in an article entitled "Mercury Glasses," Glastech. Ber. 8, 519–25 (1930), discusses efforts to incorporate mercury in glass by including mercuric carbonate in soda-lime glass batches. While it was found that coloration was imparted to the glass, analytical measurements revealed only trace amounts of mercury and in many cases no mercury at all in the glass, and X-ray diffraction confirmed the absence of metallic mercury. Strong volatilization of the mercury was observed during melting.

I have found that significant and substantial quantities of mercury can be incorporated in phosphate glasses and chemically bound therein. Mercury-containing glass in accordance with this invention has a variety of useful properties. The glasses of this invention contain from about 5% up to about 80 mercury (calculated as mercuric oxide), and preferably contain at least about 5% by weight of at least one compound of at least one of the elements of Groups I–V of the Periodic Table.

To make the glasses of this invention, I employ as necessary batch ingredients a mercury compound, such as mercury oxide in either of its valence forms, but preferably predominantly mercuric oxide, mercuric nitrate, or mercuric phosphate; a compound, preferably an oxide, nitrate, phosphate or carbonate, of an alkali, alkaline earth or other metal selected from Groups I, II, III, IV or V of the Periodic Table, such as Pb, Mg, Al, or mixtures thereof, most preferably of lithium; and a source of phosphorus oxide, such as phosphorus pentoxide. Batch losses during melting can be reduced by introducing part of the phosphorus oxide in the form of the phosphate of the lithium or other metal component. Representative suitable batch systems for use in preparing the glasses of this invention include:

| | | |
|---|---|---|
| $Li_2CO_3$ | HgO | $P_2O_5$ |
| $LiNO_3$ | HgO | $P_2O_5$ |
| $Na_2CO_3$ | HgO | $Al_2O_3$—$P_2O_5$ |
| $LiNO_3$ | HgO | $NH_4H_2PO_4$ |
| $LiPO_3$ | $Hg(NO_3)_2$ | $NH_4H_2PO_4$ |
| PbO | HgO | $P_2O_5$ |
| $Li_2CO_3$ | $Hg_3(PO_4)_2$ | $P_2O_5$ |
| $Li_3PO_3$ | HgO | $P_2O_5$ |

The proportions of ingredients can be varied within wide ranges in accordance with the properties desired in the glass. I prefer to employ from about 15% to about 75% by weight phosphorus (calculated and referred to hereinafter as $P_2O_5$) based upon the nominal composition of the glass. Ingredients other than those specified, which are compatible with the batch components, can also be incorporated in the batch in accordance with known practice. Additional ingredients can include, for example, colorants such as copper or iodine. In preferred embodiments of the invention, the amount of mercury compound (calculated as HgO) in the batch is at least twice (more preferably, at least three times) as much as the amount of the compound of Groups I–V of the Periodic Table; and the amount of phosphorus oxide source (calculated as $P_2O_5$), including the phosphorus added to the batch by way of phosphates of the other ingredients, is at least twice the amount of the compound of Groups I–V of the Periodic Table; and preferably more than twice when the mercury compound and/or the compound of Groups I–V of the Periodic Table is not a phosphate. A preferred glass in accordance with the invention has the following nominal composition: about 1–15% by weight Li (calculated as $Li_2O$), about 5–75% by weight Hg (calculated as HgO), and about 15–75% by weight phosphorus (calculated as $P_2O_5$).

The mercury glasses of the invention possess dielectric properties which are constant over a wide frequency range. They also possess a high refractive index, and good cut-off absorption in the ultraviolet at about 3500 A. and good absorption in the infrared range of the spectrum. Futhermore, the glasses of the present invention have a softening range as low as 300–500° C., and hence are well suited as solder glasses. The density of the glasses of the present invention varies with the mercury content.

The glasses of the invention show some degree of fluorescence. This is attributed to some of the mercury being present in the mercurous form. Fluorescence can be decreased by the use of oxidizing agents, such as introducing part of the batch ingredients as a nitrate, or by use of controlled lower melting temperatures.

I have further discovered that mercury-containing glasses of the present invention, which can be melted at low temperatures due to the fluxing characteristics of mercury, can be converted into harder glasses having higher softening temperatures and lower thermal expansion coefficients. This can be accomplished by heating the mercury-containing glasses of the invention to volatilize mercury therefrom and advantageously change the properties of the glass. This effect can be utilized in a number of ways, for instance, in the labeling or decorating of glass, ceramic or glass-ceramic products. By controlling the volatilization of mercury to control the properties of the ultimate product, solder glasses or series of intermediate sealing glasses can be produced from the same basic mercury-containing glass. Evaporation of the mercury from the glass compositions of the invention can be conducted also in a manner to cause devitrification of the glass whereby a glass-ceramic body or layer can be obtained. This feature finds utility in the area of devitrifying solder glasses, and can also be utilized to mark, decorate, or seal glasses which are to be converted into glass-ceramics, whereby the ceramic heat exposure of the substrate can be advantageously utilized also for the volatilization of mercury from the applied layer of the glass of the present invention.

The following examples are intended as illustrative and are not to be taken as limiting the invention. All parts are by weight except as otherwise specified.

EXAMPLE 1

A batch containing $Li_3PO_4$, HgO, and $P_2O_5$ is melted at 800° C. for about 30 minutes. The melt is then poured into a mold, allowed to cool, and the resultant glass has the following weight analysis:

| | Percent |
|---|---|
| $P_2O_5$ | 32.6 |
| $Li_2O$ | 2.8 |
| $Hg_2O$ | 10.4 |
| $HgO$ | 54.0 |

The dielectric constant of the glass at 26° C. and 30% relative humidity is as follows.

| Frequency: | Dielectric constant |
|---|---|
| 100 c.p.s. | 13.40 |
| 200 c.p.s. | 13.40 |
| 400 c.p.s. | 13.40 |
| 800 c.p.s. | 13.39 |
| 1 kc. | 13.38 |
| 2 kc. | 13.37 |
| 4 kc. | 13.36 |
| 8 kc. | 13.35 |
| 10 kc. | 13.33 |
| 20 kc. | 13.32 |
| 50 kc. | 13.30 |
| 100 kc. | 13.36 |
| 20 kc. | 13.24 |
| 50 kc. | 13.10 |
| 100 kc. | 13.10 |
| 200 kc. | 13.09 |
| 400 kc. | 13.07 |
| 500 kc. | 13.10 |
| 1 mc. | 13.20 |

The refractive index of the glass of Example 1 is in excess of 2, indicating suitability for applications requiring glass with a high refractive index, such as in astronomical refracting telescopes.

The glass of Example 1 is further characterized by opacity to ultraviolet light having a frequency below about 280 m$\mu$ and to infrared light having a frequency above about 2800 m$\mu$, while having excellent transmission in the visible range. The glass is thus useful as an optical filter, passing visible light while excluding the ultraviolet and infrared portions of the spectrum.

The glass of Example 1, like other of the glasses of this invention, can be melted at a relatively low temperature (800–1000° C.), and is thus well suited for use as a solder glass.

EXAMPLE 2

A mercury-containing glass is prepared having a nominal composition of 60% HgO, 5% $Li_2O$, and 35% $P_2O_5$, by melting a batch of 13.1 parts by weight HgO, 1.07 parts by weight $Li_2CO_3$, and 7.35 parts by weight $P_2O_5$. The batch components are slurried in an alcohol medium, dried at 110° C., and heated in a porcelain crucible until melted. The resultant glass has a refractive index of 1.750 and a density of 5.11 gm./ml.

EXAMPLES 3–13

Several different starting materials are substituted in the batch to give glasses of varying nominal composition. In each case, the starting materials are charged into porcelain crucibles, mixed with a glass rod and the crucibles covered with fused silica lids. The mixtures are slowly melted over a Fisher burner to prevent volatilization of the components and bring about solid state reaction. The batch completely liquifies after about 45 minutes and the crucibles are then placed in a desiccator and allowed to cool. Examples 3–13 are summarized in Table I. All parts and percentages are by weight, and compositions are based on synthesis, unless otherwise specified. Refractive index measurements are made by the Becke line petrographic microscope technique using Cargille certified index of refraction liquids, and density determinations are made by pycnometer using kerosene as reference liquid. The dielectric properties are determined on polished glass discs on a General Radio bridge Model No. 1610 capacitance measuring assembly with guard circuit, and Balsbaugh ES100 three-terminal guarded sample holder with electrode diameter of 0.5 inch.

TABLE I

| Example No. | Composition, percent | | | Batch ingredients (parts) | | | Refractive index | Density (g./cc. at 30° C.) | Dielectric constant 100 kc. (25° C.) | Dielectric loss |
|---|---|---|---|---|---|---|---|---|---|---|
| | HgO | $Li_2O$ | $P_2O_5$ | HgO | $Li_2CO_3$ | $P_2O_5$ | | | | |
| 3 | 65 | 5 | 30 | 10.99 | 2.08 | 5.0746 | 1.705 | 4.986 | | |
| 4 | 60 | 5 | 35 | 13.92 | $Li_3PO_4$ 2.78 | 6.496 | 1.680 | 4.646 | 9.39 | 0.00178 |
| 5 | 55 | 5 | 40 | 5.93 | 1.58 | 4.16 | 1.671 | 4.329 | 9.59 | 0.00112 |
| 6 | 50 | 5 | 45 | 6.55 | 1.619 | 5.903 | 1.649 | 4.093 | | |
| 7 | 40 | 5 | 55 | 4.83 | 1.49 | 6.645 | 1.591 | 3.630 | | |
| 8 | 30 | 5 | 65 | 3.713 | 1.528 | 8.045 | 1.599 | 3.0811 | | |
| 9 | 70 | 5 | 25 | $Hg_3(PO_4)_2$ 14.132 | 2.046 | 2.435 | 1.720 | 6.5517 | | |
| 10 | 55 | 10 | 35 | 11 | $LiPO_3$ 11.470 | | | | | |
| 11 | 40 | 10 | 50 | 2.633 | $LiPO_3$ 3.771 | 0.178 | 1.643 | 3.741 | | |
| 12 | 30 | 10 | 60 | 5.276 | $LiPO_3$ 10.076 | 2.233 | 1.589 | 2.539 | | |
| 13 | 25 | 15 | 60 | 2.543 | $Li_3PO_4$ 3.866 | 3.764 | 1.581 | 3.027 | | |

The following oxide analyses of some glasses of the foregoing examples indicate the remarkable mercury retention of the glasses of the invention:

| Example No. | HgO Percent | $Hg_2O$ Percent | $Li_2O$ Percent | $P_2O_5$ Percent |
|---|---|---|---|---|
| 9 | 60.4 | 2.6 | 5.4 | 32.6 |
| 3 | 58.5 | 3.5 | 5.3 | 32.6 |
| 4 | 53.4 | 5.6 | 4.6 | 36.4 |
| 5 | 53.1 | 4.3 | 3.9 | 38.1 |
| 6 | 38.8 | 1.2 | 5.8 | 52.9 |
| 11 | 43.7 | 3.4 | 8.4 | 44.7 |
| 7 | 37.6 | 1.7 | 4.9 | 54.8 |
| 12 | 27.7 | 2.3 | 9.6 | 59.5 |
| 8 | 29.4 | 1.8 | 4.8 | 62.1 |
| 13 | 24.3 | 0.6 | 14.7 | 60.0 |

The fact that some of the analyses do not add to 100% may be due to presence of $CO_2$, $H_2O$, and possibly $SiO_2$, $Al_2O_3$, $K_2O$, $Na_2O$ from the porcelain crucibles.

EXAMPLE 14

A batch of 1 part $LiPO_3$, 10 parts $Pb(PO_3)_2$, 10 parts $HgO$ and 10 parts $P_2O_5$ is introduced into a red-hot glazed porcelain crucible and melted at 800–1000° C. $AlPO_4$ and $P_2O_5$ are added in equal amounts until solubility limit at 800° C. is reached. The melt is then cooled into a glass.

EXAMPLE 15

A batch of 5 parts $Pb_3(PO_4)_2$, 10 parts $HgO$, and 10 parts $P_2O_5$ is melted as in Example 14. As the melt progresses, additional amounts of $HgO$ and $P_2O_5$ are added in equal proportion to each other. Subsequently, the melt is cooled into a glass.

EXAMPLE 16

A batch of 5 parts each of $Mg(PO_3)_2$, $HgO$, and $P_2O_5$ is melted without further additives. The melt is subsequently cooled into a glass.

I claim:

1. Mercury-containing phosphate glass consisting essentially of between about 5% and about 80% by weight mercury (calculated as mercuric oxide), at least about 5% by weight of at least one metal of Groups I and II of the Periodic Table, aluminum and lead (calculated as metal oxide) and between about 75% to about 15% by weight phophorous (calculated as $P_2O_5$).

2. Mercury-contining phosphate glass according to claim 1, wherein said metal is one or more of an alkali, alkaline earth, lead or aluminum.

3. Mercury-containing phosphate glass according to claim 2, wherein said metal is one or more of sodium, lithium, aluminum, lead and magnesium.

4. Mercury-containing phosphate glass according to claim 1, wherein said metal includes lithium.

5. Mercury-containing phosphate glass consisting essentially of between about 1% and about 15% by weight lithium (calculated as $Li_2O$), between about 5% and about 75% by weight mercury (calculated as HgO) and between about 15% and about 75% by weight phophorous (calculated as $P_2O_5$).

6. Mercury-containing phosphate glass according to claim 5, which optionally further contains one or more of a metal of Groups I and II of the Periodic Table, aluminum and lead.

7. Mercury-containing phosphate glass consisting essentially of between about 4% and about 15% lithium (calculated as $Li_2O$), between about 20% and about 65% mercury (calculated as HgO) and between about 30% and about 65% phosphorous (calculated as $P_2O_5$).

8. Mercury-containing phosphate glass according to claim 7, which optionally further contains one or more of a metal of Groups I and II of the Periodic Table, aluminum and lead.

9. Process for making mercury-containing phosphate glass according to claim 1, which comprises heating a batch consisting essentially of a mercury-containing compound that yields oxide of mercury, a source of phosphorous oxide and a compound of at least one metal of Groups I and II of the Periodic Table, aluminum and lead that yields an oxide of said metal, to form a melt and cooling the melt into a glass.

10. Process for making mercury-containing phosphate glass according to claim 6, which comprises heating a batch consisting essentially of a mercury-containing compound that yields oxide of mercury, a source of phosphorous oxide and a compound of lithium that yields lithium oxide, and optionally containing a compound of one or more of another metal of Group I, a metal of Group II, aluminum and lead that yields an oxide of said metal.

11. Process according to claim 10, wherein the metal compound is an oxide, nitrate, phosphate or carbonate of lithium and the mercury-containing compound is one or more of mercuric oxide, mercuric nitrate and mercuric phosphate.

12. Process according to claim 10, wherein the amount of the mercury containing components (calculated as HgO) or the phosphorous oxide in the batch (calculated as $P_2O_5$) is at least twice the amount of the lithium compound.

References Cited

UNITED STATES PATENTS

| | | | |
|---|---|---|---|
| 2,982,053 | 5/1961 | Elmer | 65—134 X |
| 2,999,819 | 9/1961 | Blair | 250—71 X |
| 3,149,234 | 9/1964 | Hood et al. | 106—47 X |
| 3,328,181 | 6/1967 | Weidel | 106—47 |

OTHER REFERENCES

Imaoka, M., Glass-Formation Range and Glass Structure, in Advances in Glass Technology, I, New York (Plenum Press) 1962 p. 152.

HELEN M. McCARTHY, Primary Examiner

W. R. SATTERFIELD, Assistant Examiner